(12) United States Patent
Johri et al.

(10) Patent No.: US 12,555,013 B2
(45) Date of Patent: Feb. 17, 2026

(54) SYSTEM AND METHOD FOR QUANTUM COMPUTING TO GENERATE JOINT PROBABILITY DISTRIBUTIONS

(71) Applicant: IonQ, Inc., College Park, MD (US)

(72) Inventors: Sonika Johri, Portland, OR (US); David Bacon, Seattle, WA (US)

(73) Assignee: IonQ, Inc., College Park, MD (US)

( * ) Notice: Subject to any disclaimer, the term of this patent is extended or adjusted under 35 U.S.C. 154(b) by 771 days.

(21) Appl. No.: 17/888,077

(22) Filed: Aug. 15, 2022

(65) Prior Publication Data

US 2023/0051669 A1 Feb. 16, 2023

Related U.S. Application Data

(60) Provisional application No. 63/233,537, filed on Aug. 16, 2021.

(51) Int. Cl.
*G06N 10/20* (2022.01)
*G06N 10/60* (2022.01)

(52) U.S. Cl.
CPC ............. *G06N 10/20* (2022.01); *G06N 10/60* (2022.01)

(58) Field of Classification Search
CPC ...... G06N 10/20; G06N 10/60; G06N 3/0475; G06N 7/01; G06N 20/00; G06N 10/40
See application file for complete search history.

(56) References Cited

U.S. PATENT DOCUMENTS

2017/0300911 A1* 10/2017 Alnajem ............ G06Q 20/4014

OTHER PUBLICATIONS

Lovas, On the Notion of Quantum Copulas, pp. 1-10, Dec. 2019.*
Schuld, Quantum Machine Learning in Feature Hilbert Spaces, pp. 040504-1-040504-6 (Year: 2019).*
Middleton, What's Under the Hood of a Quantum Computer?, pp. 1-12, Mar. 5, 2021.*
Weedbrook, Gaussian quantum information, pp. 621-669 (Year: 2012).*
Domino, "Selected Methods for non-Gaussian Data Analysis," arxiv.org, Cornell University Library, Nov. 23, 2018, pp. 1-133.
(Continued)

*Primary Examiner* — Albert M Phillips, III
(74) *Attorney, Agent, or Firm* — ARENTFOX SCHIFF LLP (57) ABSTRACT

Aspects of the present disclosure relate generally to systems and methods for use in the implementation and/or operation of quantum information processing (QIP) systems, and more particularly, to the computation of joint probability distributions with quantum computers. Improvements in the computation of joint probability distributions are described by designing quantum machine learning algorithms to model copulas. Moreover, any copula is shown to be naturally mapped to a multipartite maximally entangled state. A variational ansatz referred to herein as a "qopula" creates arbitrary correlations between variables while maintaining the copula structure starting from a set of Bell pairs for two variables, or Greenberger-Horne-Zeilinger (GHZ) states for multiple variables. Generative learning algorithms may be demonstrated on quantum computers, and more particularly, in trapped-ion quantum computers. The approach described herein is shown to have advantages over classical models.

16 Claims, 6 Drawing Sheets

(56) References Cited

OTHER PUBLICATIONS

International Search Report and Written Opinion in PCT/US2022/040415, mailed Nov. 2, 2023, 13 pages.
Milek, "Quantum Implementation of Risk Analysis-relevant Copulas," arxiv.org, Cornell University Library, Feb. 18, 2020, pp. 1-15.
Tang et al., "Quantum Computation for Pricing the Collateralized Debt Obligations," arxiv.org, Cornell University Library, Aug. 6, 2020, pp. 1-19.
Zhu et al., "Generative quantum learning of joint probability distribution functions," arxiv.org, Cornell University Library, Sep. 13, 2021, pp. 1-19.

* cited by examiner

SYSTEM AND METHOD FOR QUANTUM COMPUTING TO GENERATE JOINT PROBABILITY DISTRIBUTIONS

PRIORITY

This application claims priority to and the benefit from U.S. Provisional Application No. 63/233,537, filed on Aug. 16, 2021, and titled "System and Method for Quantum Computing to Generate Joint Probability Distributions," the contents of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, functionality, and/or use of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of improvements in the computation of joint probability distributions by designing quantum machine learning algorithms to model copulas. Moreover, this disclosure shows that any copula can be naturally mapped to a multipartite maximally entangled state. A variational ansatz referred to herein as a "qopula" creates arbitrary correlations between variables while maintaining the copula structure starting from a set of Bell pairs for two variables, or Greenberger-Horne-Zeilinger (GHZ) states for multiple variables. Generative learning algorithms may be demonstrated on quantum computers, and more particularly, in trapped-ion quantum computers. The approach described herein is shown to have advantages over classical models.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

The statistical relationship between several random variables is critical to data-based analysis and decision-making. Some examples of the many applications in which the statistical relationship between random variables may come into play include risk management, portfolio optimization, reliability analysis, recommender systems, climate research, and medical imaging, to name a few. Traditionally, single-parameter quantities have been used to model the dependence between different random variables. However, such measures are good for monotonic dependence, which is frequently too simplistic for real data. Data, such as that from the financial markets, engineering reliability studies, and earth/atmospheric sciences, for example, tends to exhibit tail dependence (e.g., non-monotonic dependence), which means that the random variables do not appear to have much correlation but exhibit dependence in extreme deviations.

Due to the reasons provided above, the relationship between random variables is now commonly modeled using a dependence function between uniformly distributed variables, called a "copula." Sklar's theorem provides a way to construct multivariate (e.g., involving a number of independent variables) stochastic models through a copula approach and thus provides the theoretical foundations for the use of copulas. The theorem states that any multivariate joint distribution can be written or expressed in terms of univariate marginal distributions and a copula that describes the dependence structure between the variables. The use of copulas has found its way into many applications, including but not limited to quantitative finance, engineering, and medicine, for example.

More recently, in the field of machine learning, for example, generative models have been proposed for statistical modeling that learn to generate new data with the same statistics as a given training dataset, effectively learning the distribution of the training dataset. As such, these models may be used to produce or output new data samples that could plausibly have belonged to the original dataset. One of the most successful of these models is the Generative Adversarial Network (GAN), in which two neural networks compete with one another in a minimax game, that is, a form of zero-sum game where one agent's gain is the other agent's loss. There is still some debate over whether GANs are able to successfully learn a given distribution.

In this context, the question arises whether quantum computers can provide any advantage over classical models for generating samples that reproduce the inter-dependence between multiple variables of a given dataset. Quantum wavefunctions naturally represent probability distributions which may be hard to sample from by classical algorithms. Quantum computers may also be used to generate correlations which cannot be efficiently reproduced by classical means. Therefore, it appears that learning dependence between multiple random variables is something at which a quantum computer may excel. Quantum generative models such as the Quantum Circuit Born Machine (QCBM) and Quantum Generative Adversarial Network (QGAN) have been proposed as quantum algorithms for the learning of both classical and quantum data. A QGAN can be used to learn either classical or quantum data, while a QCBM is a quantum generative model like the generator part of QGAN, except the training objective is different. Since quantum algorithms are known to achieve speedup over classical algorithms in a variety of tasks, it is believed that quantum generative models may have better performance than classical generative models in terms of expressivity, stability during training, and shorter training time.

Generative quantum learning has either been restricted to learning quantum data, univariate distributions, or multivariate distributions without separating the correlation structure from the marginal distributions. In this disclosure, the concept of generative quantum learning is extended by using a natural connection between entanglement and the copula function. A variational ansatz based on this insight may lead to an exponential advantage over classical methods of generating multivariate correlations.

Solutions to the issues described above are explained in more detail in connection with FIGS. 1-6, with FIGS. 1-3 providing a background of QIP systems or quantum computers, and more specifically, of atomic-based QIP systems or quantum computers.

Figure 1:
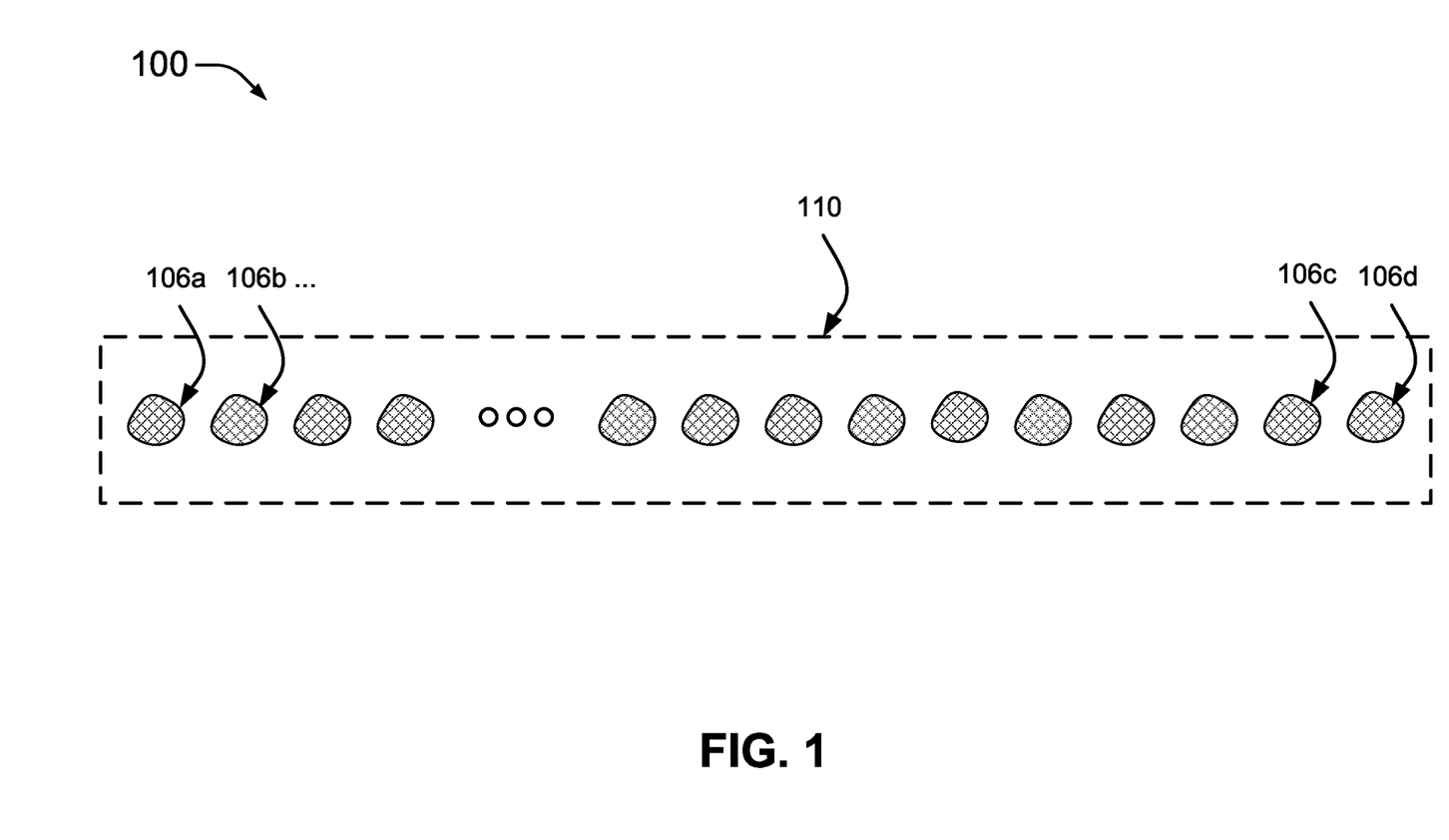
FIG. 1 illustrates a view of atomic ions a linear crystal or chain in accordance with aspects of this disclosure.
Figure 2:
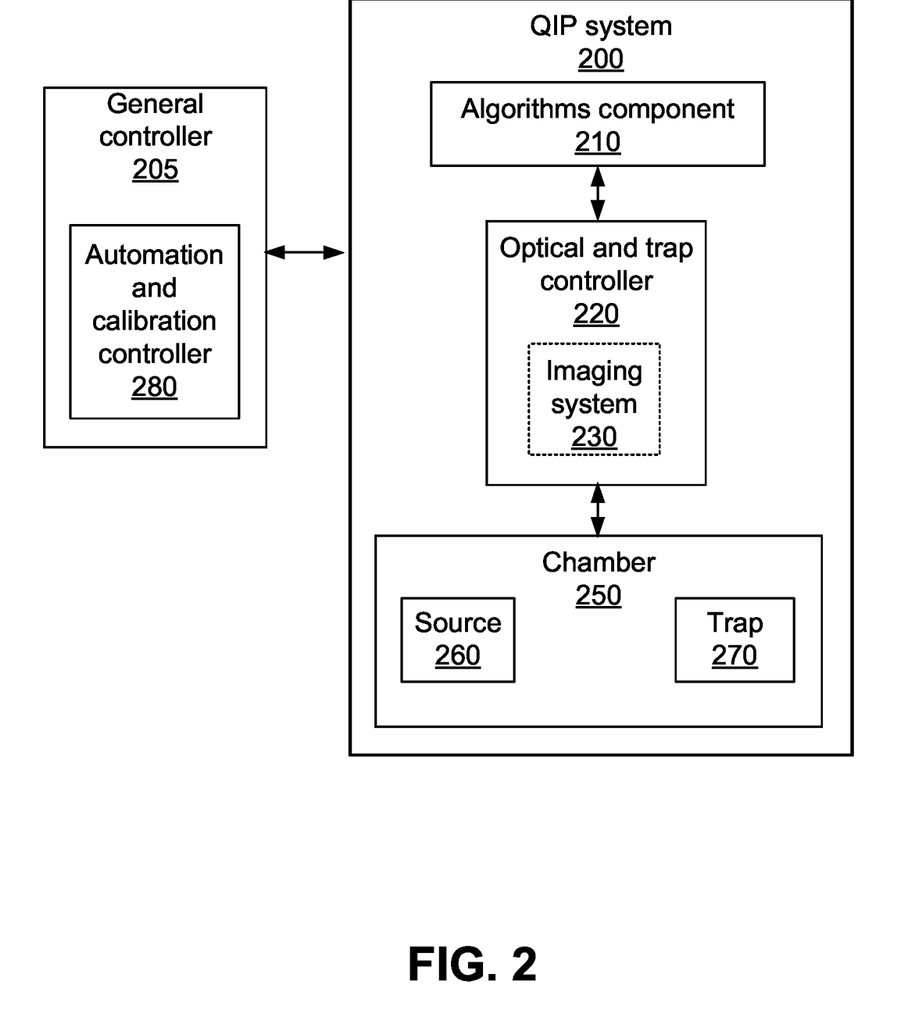
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}Y^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

QIP systems or quantum computers that use a chain of trapped atomic-based qubits as described in the diagram 100 in FIG. 1 may be used to perform operations that improve the computation of joint probability distributions based on quantum machine learning algorithms that model copulas.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The algorithms component 210 may be configured to perform some or all of the operations associated with improving the computation of joint probability distributions based on quantum machine learning algorithms that model copulas. Therefore, aspects of this disclosure may be implemented at least partially using the algorithms component 210, including the generation of instructions or signal for the QIP system 200 to implement related quantum circuits.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Figure 3:
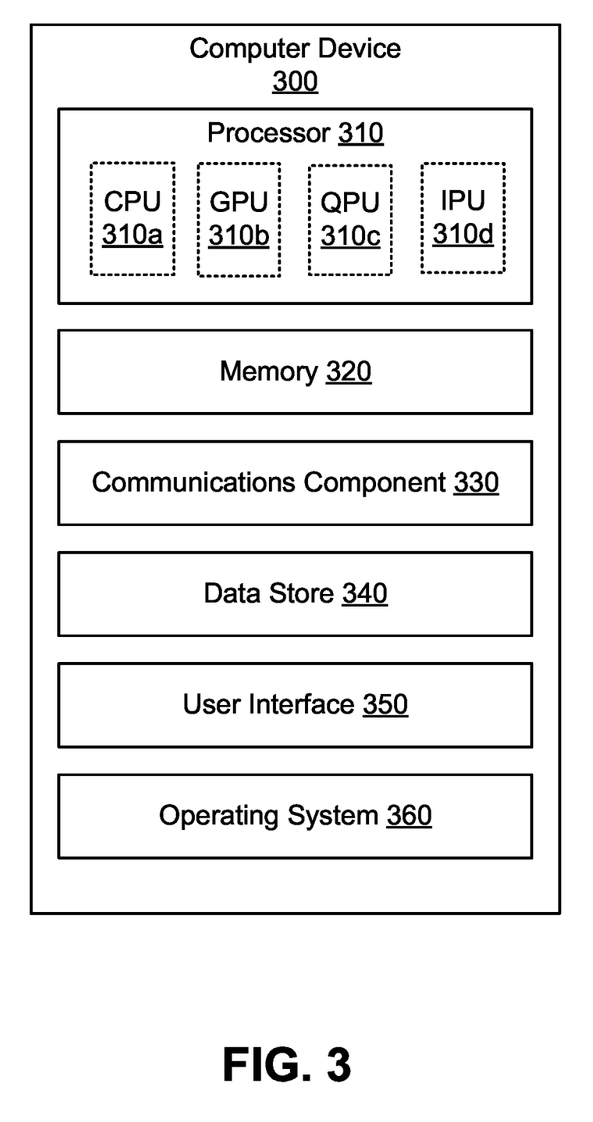
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, QIP systems or quantum computers may be used to improve the computation of joint probability distributions based on quantum machine learning algorithms, and more specifically generative quantum learning algorithms, that model copulas. As mentioned above, the concept of generative quantum learning may be extended by using a natural connection between entanglement and the copula function. A variational ansatz based on this insight may lead to an exponential advantage over classical methods of generating multivariate correlations.

Copula and Quantum Entanglement

With respect to copulas and quantum entanglement, given random variables $(\chi_1, \ldots, \chi_d)$, probability integral transform states that the marginal cumulative distribution defined as $F_i(x) = Pr[\chi_i \leq x]$ satisfies $Pr[F_i(\chi_i) \leq u] = u$. Therefore, the random variables $$(\mathcal{U}_1, \ldots, \mathcal{U}_d) = (F_1(\chi_1), \ldots F_d(\chi_d)) \quad (1)$$

have marginals that are uniformly distributed on $[0, 1]$.

A copula C of $(\chi_1, \ldots, \chi_d)$ is defined as the joint cumulative distribution function $(\mathcal{U}_1, \ldots, \mathcal{U}_d)$:

$$C(\mathcal{U}_1, \ldots, \mathcal{U}_d) = Pr[\mathcal{U}_1 \leq \mathcal{U}_1, \ldots, \mathcal{U}_d \leq \mathcal{U}_d]. \quad (2)$$

Reversing the above steps gives a way to generate samples from multivariate distributions. Given a procedure to generate samples $(U_1, \ldots, U_d)$ from the copula function C, $$(\chi_1, \ldots, \chi_d) = (F_1^{-1}(\mathcal{U}_1), \ldots, F_d^{-1}(\mathcal{U}_d)) \quad (3)$$

would be samples from the original multivariate distribution.

Sklar's theorem states that every multivariate cumulative distribution function can be expressed in terms of its marginals and a copula, i.e., $$Pr[\chi_1 \leq x_1, \ldots, \chi_d \leq x_d] = C(F_1(x_1), \ldots, F_d(x_d)). \quad (4)$$

Copulas are used to simulate correlated variables because they remove the structure of the marginal distributions and capture just the point-wise correlation between variables. Simple copula formulas are extensively used in finance, engineering and medicine. However, these simple formulae often fall short in accurately capturing the relationship between variables. Instead, more sophisticated or empirical copulae can be used but these become hard to model and sample from as the number of variables increases. Generative models have been shown to be successfully used to model copulas.

Any copula can be represented by a maximally entangled quantum state. This disclosure proposes the construct, implementation, and operation of a quantum circuit that can prepare maximally entangled states that represent copulas up to relative phases, which is referred to herein as a "qopula" circuit. The quantum circuit for two random variables is shown in a diagram 400 in FIG. 4.

Figure 4:
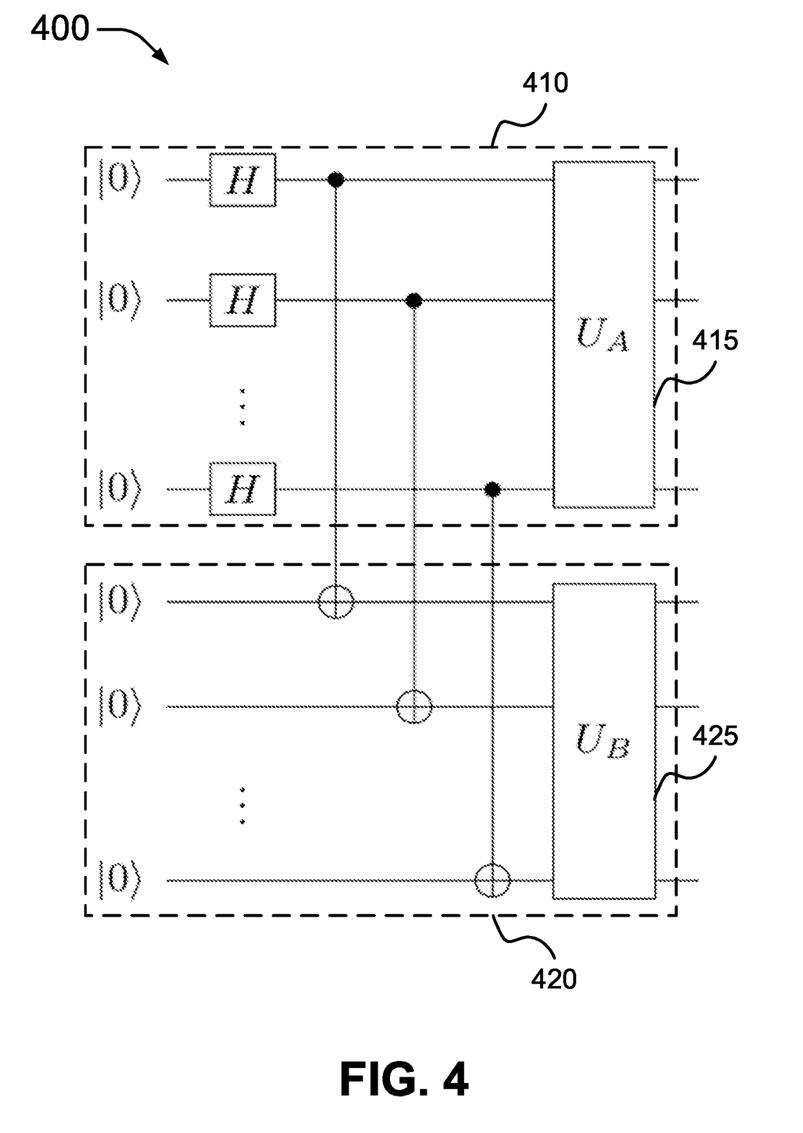
FIG. 4 illustrates an example of a qopula circuit with two random variables in accordance with aspects of the disclosure.
Figure 5:
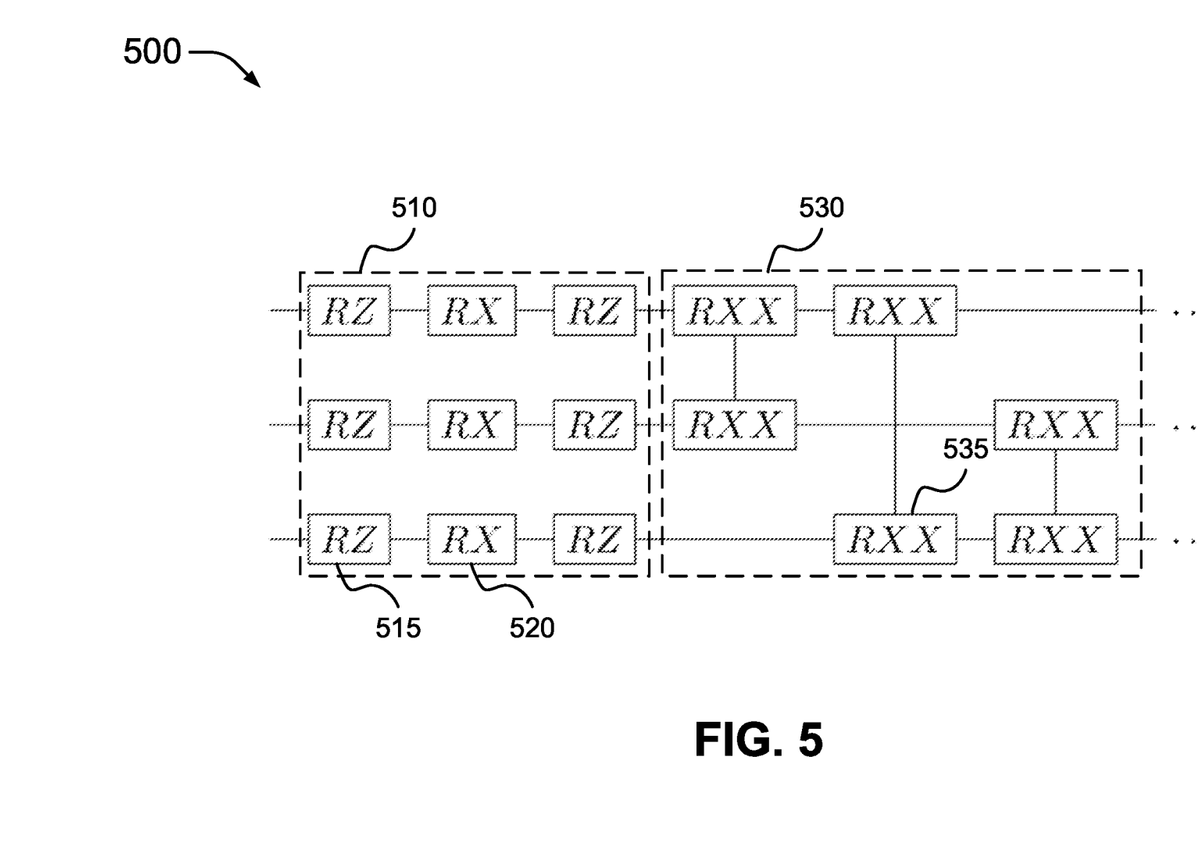
FIG. 5 illustrates an example of an ansatz for U in FIG. 4 that corresponds to three qubits in accordance with aspects of the disclosure.

Although the "qopula" circuit in the diagram 400 is for two (2) random variables, it is possible to extend the circuit to more than two random variables. The top half/part 410 of the circuit consists of qubits that belong to the register which provides samples of the first random variable. The bottom half/part 420 of the circuit consists of qubits that belong to the register which provides samples of the second random variable.

The top part 410 of the circuit 410 consists of the creation of $N_q/2$ Bell pairs which are distributed between two registers A and B. The boxes labeled as H are single qubit operators referred to as Hadamard operators or Hadamard gates. This operation results in the creation of a state of the form:

$$\frac{1}{2^{N_q/4}} \sum_{i=0}^{2^{N_q/2}-1} |i_A\rangle |i_B\rangle. \tag{5}$$

In this state, the reduced density matrix of the states in each register is completely mixed (e.g., $\rho_A=I/|A|$). In the next step, unitaries act locally on registers A and B. Since $U^\dagger I U=I$, the action of the unitaries does not change the reduced density matrix, but it does change the correlations between the registers A and B. Note that the unitaries on each register can be set by parameters that are independent of the other. In this example, the unitaries for registers A and B are labeled as unitary operators $U_A$ 415 and $U_B$ 425 in the diagram 400, respectively.

If each register is measured in the computational basis with output, $x_1, \ldots, x_n, y_1, \ldots, y_n$ the measured bitstrings can represent discretized values of each random variable in the domain [0, 1] through the following linear transformation $$x = \frac{1}{2^{1+n}} + \sum_{k=0}^{n} \frac{1}{2^n} x_n. \tag{6}$$

Therefore, this ansatz can model the correlations between uniform random variables and capture the copula dependence structure.

The number of qubits in each register determines the discretization of the probability distribution. The larger the number of qubits, the more finely the point-wise correlation can be learnt. If the number of qubits is restricted, for practical applications, it is possible to use the available qubits to learn the significant bits and then append random bits in the position of the less significant bits.

As noted above, the "qopula" circuit can be extended to more than 2 variables by preparing Greenberger-Horne-Zeilinger (GHZ) states instead of Bell pairs as the starting point on which the operators U act. The exact structure of U need not be restricted. A structure that consists of layers alternating between a 'driver' layer 510 that consists of parametrized single qubit rotations RZ gates 515 and RX gates 520 and an 'entangler' layer 530 that consists of RXX gates 535 is shown in a diagram 500 in FIG. 5. In the diagram 500, the ansatz for U corresponds to three (3) qubits. The gates are parametrized by angles that are optimized during the learning process. The structure can be repeated for multiple layers each with different parameters. In this example, the two-qubit RXX gates 535 represent $\exp(i\theta X_i X_j)$ acting on qubits i and j, which can be executed as CNOT(i, j) $\exp(i\theta X_j)$CNOT(i, j) using standard gates available on gate-model quantum computers. The RZ gates 515 and the RX gates 520 represent rotations around the Z and X axes.

Quantum Computational Advantage

The following is a description of the computational advantage in the quantum machine learning algorithms described herein over classical machine learning algorithms such as neural networks and that may be achieved by using the types of quantum circuits described above.

One source of advantage during learning stems from Bell's Theorem. For example, consider a Bell pair of two qubits. One qubit is given to an entity (say Alice) and the other to a different entity (say Bob). At this stage, they each also have access to random variables which share arbitrary correlations. Next, suppose they are given variables x and y which are not shared, and they make measurements on their qubits obtaining results a and b respectively. Then quantum mechanics implies that the joint probability distribution of a and b conditioned on their unique variables, P(a, b|x, y), cannot be reproduced by classical means without communication between Alice and Bob. Further, when n Bell pairs are shared between Alice and Bob, the quantum correlations quantified by P(a, b|x, y), can only be reproduced by classical means if $O(2^n)$ number of bits are exchanged between Alice and Bob.

Next is an analysis of the implication of this for the quantum learning algorithms described herein in comparison with classical learning schemes. The communication flow in the quantum learning scheme is shown on the left part of a diagram 500 in FIG. 6. In the diagram 600, a comparison is shown between a quantum learning on the left and a classical learning on the right. In both learning a classical optimizer 620 is used. On one hand, $U_A$ 625 and $U_B$ 630 are unitaries that act on entangled Bell pairs as described above. On the other hand, $C_A$ 635 and $C_B$ 640 are operations on classical bits.

Figure 6:
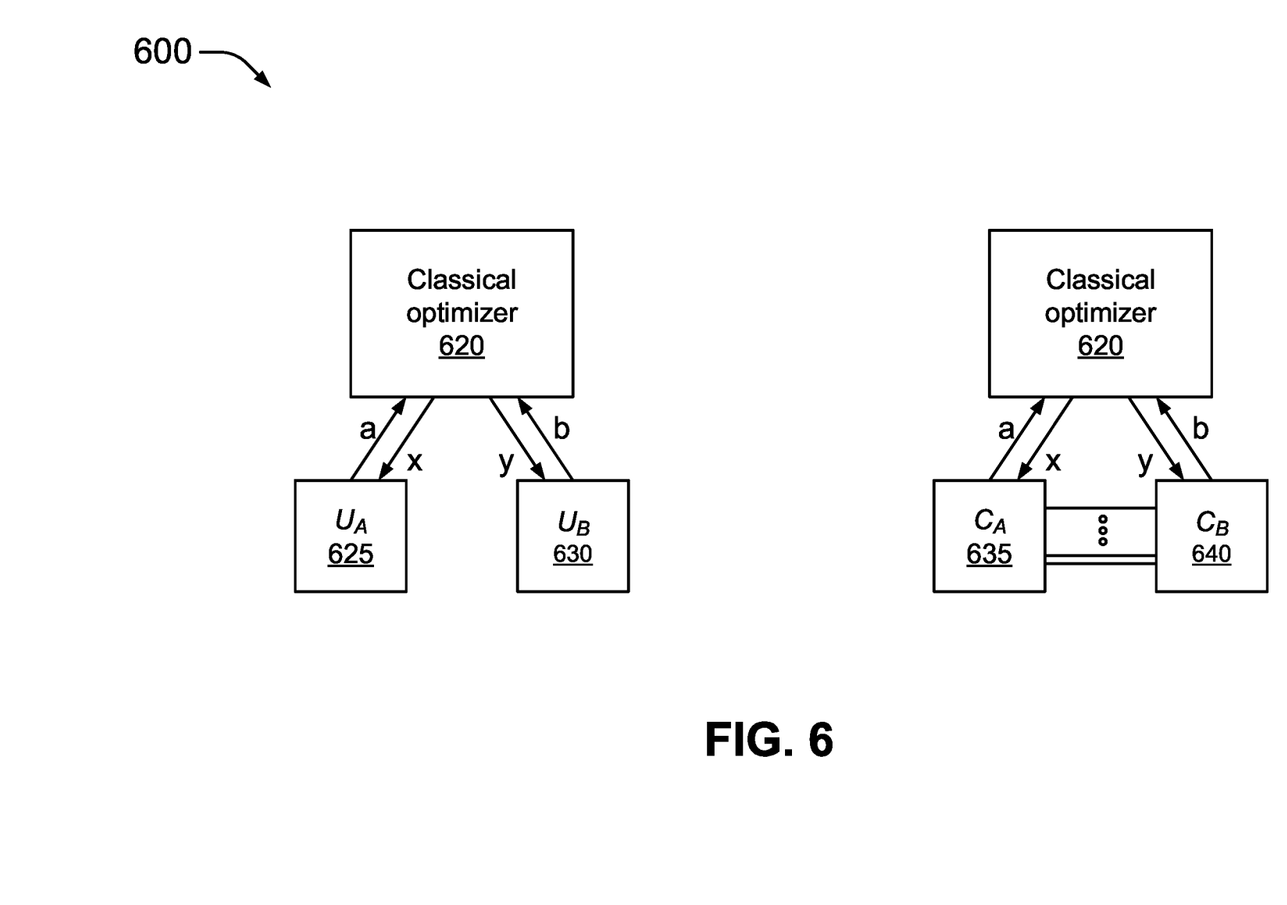
FIG. 6 illustrates an example of a comparison between quantum and classical learning in accordance with aspects of the disclosure.

Once the Bell pairs are created, the classical computer executing the optimization scheme (e.g., the classical optimizer 620) can separately send variables x and y (here, equivalent to the angles in the ansatz) to $U_A$ 625 and $U_B$ 630, respectively. The measurements a and b are then collectively processed by the classical optimizer 620 to produce the angles for the next iteration. Now consider the classical case. In general, the input to the classical generator is a vector of random bits, say of length 2n. Assign half of the bits to A and the rest to B. The number of bits will determine the number of unique outputs produced. Any classical operation can be written as a combination of operations that only acts on the bits of A or B separately, and operations that acts on both sets of bits. The latter can be further modeled as operation on the bits belonging to A, followed by communication to B and then operations on just on the bits belonging to B (right part of FIG. 3), and vice versa. Then, in order to simulate P (a, b|x, y) for arbitrary x and y sent by the classical optimizer 620, it follows that the amount of communication between A and B would need to scale as $O(2^n)$, making the quantum learning operation much more appealing.

Aspects of the diagram 600, including the classical optimizer 620, may be implemented using the algorithms component 210 in the QIP system 200 and/or a classical computer connected to the QIP system 200, for example. Aspects of the diagram 600, including the classical optimizer 620, may be implemented using one or more components in the computer device 300, for example.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system configured to implement and execute a quantum circuit, the system comprising:
a memory configured to store instructions; and
one or more quantum processing units configured to execute the instructions stored on the memory in order to:
implement the quantum circuit that is configured to prepare maximally entangled states that represent copulas for a multivariate joint cumulative distribution function associated with quantum machine learning algorithms, the multivariate joint cumulative distribution function being for two or more random variables that include a first random variable and a second random variable and the quantum circuit includes a top part and a bottom part, and
execute the quantum circuit using atomic-based qubits or superconducting qubits, wherein:
the top part of the quantum circuit includes respective qubits associated with a first register that provides samples of the first random variable, and
the bottom part of the quantum circuit includes respective qubits associated with a second register that provides samples of the second random variable.

2. The QIP system of claim 1, wherein the quantum circuit is configured to prepare maximally entangled states that represent copulas up to relative phases.

3. The QIP system of claim 1, further comprising an optical and trap component configured to control operations of atomic-based qubits.

4. The QIP system of claim 3, wherein the atomic-based qubits are trapped ions.

5. The QIP system of claim 1, wherein a number of qubits associated with the first register and the second register corresponds to a discretization of the multivariate joint cumulative distribution function.

6. The QIP system of claim 5, wherein, if the number of qubits is restricted, the number of qubits that are available are used for most significant bits of a point-wise correlation of the multivariate joint cumulative distribution function and random bits are appended for least significant bits of the point-wise correlation.

7. The QIP system of claim 1, wherein the top part of the quantum circuit is configured to generate $N_q/2$ Bell pairs that are distributed between the first register and the second register.

8. The QIP system of claim 7, wherein a reduced density matrix of states in each of the first register and the second register is mixed.

9. The QIP system of claim 8, wherein:
the top part of the quantum circuit is configured to apply a first unitary operation to the reduced density matrix of states in the first register, and
the bottom part of the quantum circuit is configured to apply a second unitary operation to the reduced density matrix of states in the second register.

10. The QIP system of claim 9, wherein:
the QIP system is configured to be connected to or to include a classical optimizer,
the classical optimizer is configured to send the samples of the first random variable for the first unitary operation and to receive measurements from the first unitary operation, and
the classical optimizer is configured to send the samples of the second random variable for the second unitary operation and to receive measurement from the second unitary operation, and
the classical optimizer produces a next iteration based on the measurements received from the first unitary operation and the second unitary operation.

11. The QIP system of claim 10, wherein the samples of the first variable and the samples of the second variable are in the form of angles in an ansatz.

12. The QIP system of claim 10, wherein the next iteration includes angles in an ansatz for the first random variable and for the second random variable.

13. The QIP system of claim 1, wherein, for more than two random variables, the quantum circuit is configured to generate Greenberger-Horne-Zeilinger (GHZ) states and to apply unitary operators on the GHZ states.

14. The QIP system of claim 13, wherein the quantum circuit includes layers alternating between a driver layer and an entangling layer.

15. The QIP system of claim 14, wherein the driver layer includes parametrized single qubit rotations RZ gates and RX gates.

16. The QIP system of claim 14, wherein the entangling layer includes two-qubit RXX gates.

* * * * *